United States Patent
Grove

(10) Patent No.: US 6,579,413 B1
(45) Date of Patent: Jun. 17, 2003

(54) WET-FORMED MAT APPLICATIONS FOR CEMENT BACKERBOARDS

(75) Inventor: Dale A. Grove, Pataskala, OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 0 days.

(21) Appl. No.: 10/103,239

(22) Filed: Mar. 21, 2002

(51) Int. Cl.$^7$ ............................................. D21H 13/36
(52) U.S. Cl. ......................... 162/145; 162/149; 162/156
(58) Field of Search ........................... 162/156, 145, 162/146, 149, 157.1; 428/224, 288, 311.1

(56) References Cited

U.S. PATENT DOCUMENTS

| | | | |
|---|---|---|---|
| 2,747,994 A | * | 5/1956 | Hoopes ..................... 162/156 |
| 3,284,980 A | | 11/1966 | Dinkel |
| 4,118,272 A | * | 10/1978 | Ziegler et al. ............. 162/156 |
| 4,200,487 A | * | 4/1980 | Bondoc et al. ............ 162/156 |
| 4,258,098 A | | 3/1981 | Bondoc et al. |
| 4,476,175 A | | 10/1984 | Forry et al. |
| RE32,037 E | | 11/1985 | Clear |
| 4,898,769 A | | 2/1990 | Laflin et al. |
| 4,916,004 A | | 4/1990 | Ensminger et al. |
| 5,350,554 A | | 9/1994 | Miller |
| 5,772,846 A | | 6/1998 | Jaffee |
| 5,804,003 A | | 9/1998 | Nishizawa |
| 5,981,406 A | | 11/1999 | Randall |
| 6,054,022 A | * | 4/2000 | Helwig et al. ............. 162/156 |
| 6,054,205 A | | 4/2000 | Newman et al. |
| 6,167,668 B1 | | 1/2001 | Fine et al. |
| 6,187,409 B1 | | 2/2001 | Mathieu |
| 6,187,697 B1 | | 2/2001 | Jaffee et al. |
| 6,251,224 B1 | | 6/2001 | Dong |
| 6,254,817 B1 | | 7/2001 | Cooper et al. |

FOREIGN PATENT DOCUMENTS

DE 41 27 932 2/1993

* cited by examiner

Primary Examiner—Peter Chin
(74) Attorney, Agent, or Firm—Inger H. Eckert; Stephen W. Barns; Maria C. Gasaway

(57) ABSTRACT

A wet-formed permeable mat composed of wet use chopped strands (WUCS), chopped roving, and potentially unidirectional roving coupled with an alkaline resistant binder are combined to create an randomly oriented open mat structure with a high degree of openness that can be used in cement backerboard applications. The cement backerboard that is subsequently formed from the wet-formed permeable mat has lower binder content, superior decorative finish, and better permeability control than known glass scrim systems and can be produced in a single continuous step.

15 Claims, 3 Drawing Sheets

WET-FORMED MAT APPLICATIONS FOR CEMENT BACKERBOARDS

TECHNICAL FIELD AND INDUSTRIAL APPLICABILITY OF THE INVENTION

The present invention relates generally to cement backerboards and more specifically to wet formed mat applications for cement backerboards.

BACKGROUND OF THE INVENTION

Interior and exterior construction boards with cores of plaster, cement, or hybrid materials, such as cement boards or gypsum boards, are used in a wide variety of indoor and outdoor structural applications. For example, cement boards are used as a support surface for overlying materials such as wood siding, stucco, aluminum, brick, tile, stone aggregate and marble. Also, cement boards are used in exterior insulating systems, commercial roof deck systems, masonry applications and exterior curtain walls.

Generally, cement boards contain a core formed of a cementitious material and low density fillers that are interposed between two facing layers. Facing materials advantageously contribute flexural and impact strength to the high compressive strength but brittle material forming the cementitious core. In addition, the facing material can provide a durable surface and/or other desirable properties to the cement board.

One material that has been used to form facing materials is alkaline resistant, binder coated glass fibers. Glass fiber facings provide increased dimensional stability in the presence of moisture and provide greater physical and mechanical properties to the cement board. These facing sheets are formed as randomly oriented fibrous glass mats or open mesh glass scrims formed from continuous glass yarns. Known methods for making cementitious boards consists of providing a continuous feed of facing material and depositing a cementitious slurry onto the top surface of the facing material. A second continuous feed of facing material is then applied to the top surface of the slurry. The slurry is dried to harden the cementitious composition and to integrate the facing material into the cement board. The cement board is subsequently cut to a predetermined length for shipping and eventual use.

Known glass scrim systems used to make the glass facing sheets typically include about 60% polyvinyl chloride (PVC) and glass scrim solutions that are manufactured in an expensive, two step process. Although some binder protection from highly alkaline conditions is required, the high binder levels are more likely due to process/coating related issues. Higher binder loading levels are required in existing glass facing sheets due to (i) throughput issues in a single strand coating operation, if precoated strands are employed; (ii) coating control issues that arise in coating pre-weaved fabrics; and (iii) possible wet out issues associated with thick, plasticized PVC resins. Biaxial 0/90 oriented scrims exhibit pitting in highly open porous regions.

It is therefore highly desirable to provide glass scrim system that can be formed in a single step operation that uses less binder material. It is also highly desirable that such a process will result in superior decorative finishes and better permeability control.

SUMMARY OF THE INVENTION

The present invention comprises combining an alkaline resistant binder with a permeable wet-formed mat composed of wet use chopped strands (WUCS), chopped dry strands or roving, and potentially unidirectional roving to create an open mat structure that can be used in cement backerboard applications.

A unique aspect of the present invention is the behavior of the wet chop strands and dry chop strands in the dispersion prior to forming the mat. Wet chop strands tend to spread out randomly within the whitewater dispersion. Dry chop strands will also randomly orient, however the material tends to stay together in the whitewater dispersion (like a log). Hence, the permeable matting formed is not a completely random network of wet and dry chop, thereby giving a mat with a higher degree of openness as measured by Frazier air permeability. This improves cement impregnation.

Other objects and advantages of the present invention will become apparent upon considering the following detailed description and appended claims, and upon reference to the accompanying drawings.

DETAILED DESCRIPTION AND PREFERRED EMBODIMENTS OF THE INVENTION

Figure 1:
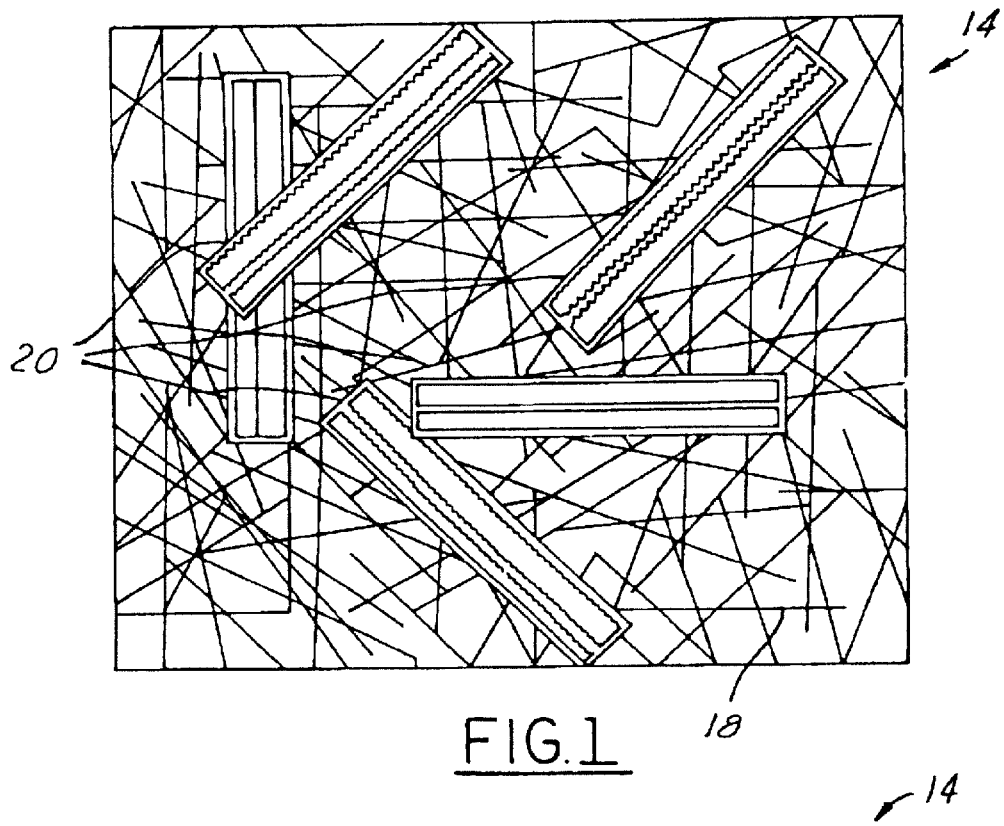
FIG. 1 is a perspective view of a randomly oriented open mesh filament network according to a preferred embodiment of the present invention.
Figure 2:
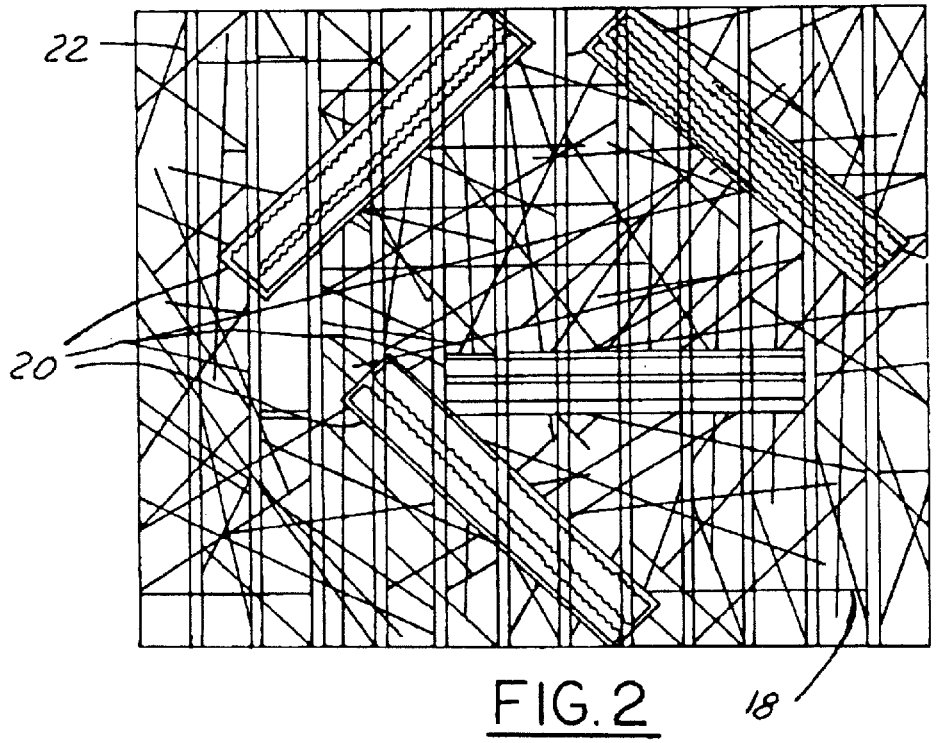
FIG. 2 is a perspective view of a randomly oriented open mesh filament network according to another preferred embodiment of the present invention.

FIGS. 1 and 2 illustrate a randomly oriented open mesh filament network 14 according to two preferred embodiments of the present invention. As will be shown in FIG. 3 below, the randomly oriented open mesh filament network 14 of FIGS. 1 and 2 may then be impregnated with an alkaline resistant binder 16 to form a wet permeable mat 10. This wet permeable mat 10, in turn, may be immersed and embedded with cement to form a cement backerboard 110 having improved decorative characteristics and other properties as described in FIG. 4.

Figure 3:
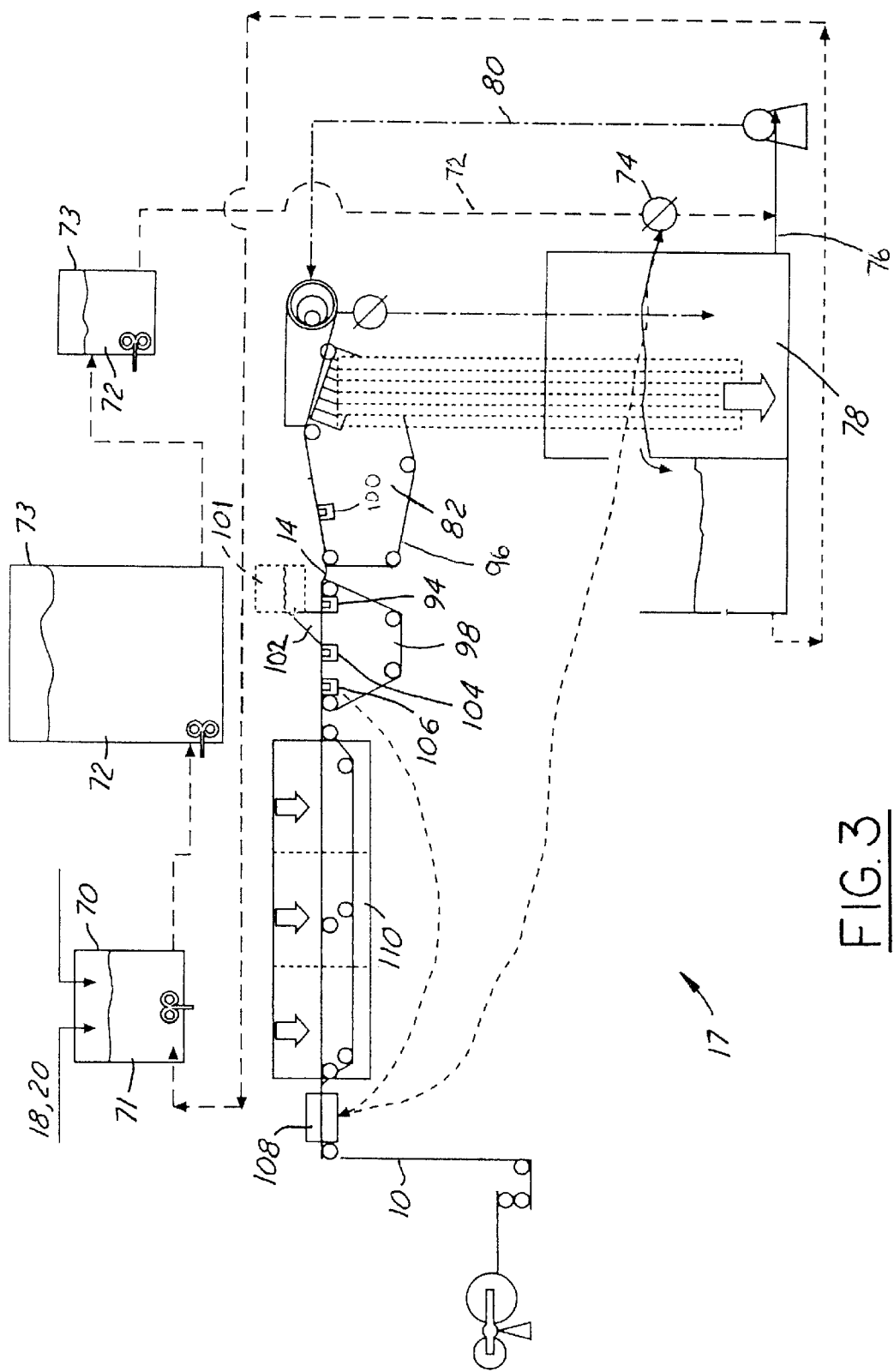
FIG. 3 is a perspective view of a processing line used to form the a wet formed permeable mat and the randomly oriented open mesh filament network of FIGS. 1 and 2.

Referring to FIG. 1, the randomly oriented open mesh filament network 14 comprises a combination of sized wet use chop strands (WUCS) 18 and sized dry chop fiber strands 20 in lengths between approximately 0.75 and 1.5 inches in approximately a 25–75/75–25 weight percentage ratio (or between a 3:1 and 1:3 weight percent ratio). As shown in FIG. 3 below, the strands 18, 20 are randomly dispersed throughout the network 14 using a whitewater chemical dispersion 71.

Preferably, the strands 18, 20 comprise E-type glass filaments, S-type glass filaments, alkaline resistant glass filaments, or ECR-type glass filaments such as Owens Corning's Advantex® glass fibers. However, other types of fiber having sufficient modulus (i.e. similar in modulus to the fibers described above) may be used as well, including basalt fibers and wood natural fibers such as cellulose and wood.

In the case of wet use chop strands 18, low solids sizing compositions are employed that contain high dispersive chemistries. The finished product remains in a moist state having moisture contents running between 10 and 25%. One preferred wet use chop strand 18 having a low solids sizing that meets these requirements is Owens Corning's 9501 filaments.

In the case of dry chop strands 20, sizing compositions having higher solids levels are employed, and the filaments are dried and cured before final packaging. One preferred dry chop strand 20 having a high solids coating that meets these requirements is Owens Corning's 893 filaments, available in roving form but capable of being chopped into the proper size by methods well known in the art.

In an alternative preferred embodiment, as shown in FIG. 2, the network 14 also comprises unidirectional rovings 22 combined with a 25–75/75–25 weight percentage ratio of wet use and dry strands 18, 20. The unidirectional rovings 22 comprise approximately 20 to 50% of the total fiber weight of the network 14. The unidirectional rovings 22 have a similar sizing composition to the dry use strands 20. One preferred unidirectional roving 22 that meets these requirements is Owens Corning's 377 unidirectional glass rovings.

FIG. 3 illustrates a processing line 17 used for forming the random open mesh filament network 14 of FIGS. 1 and 2 and further forming a wet process permeable mat 10 that is used to make a cement backerboard 110. A 25–75/75–25 by weight percentage combination of the wet chop 18 and dry chop strands 20 are added to a whitewater chemical dispersion 71 within a whitewater tank 70 to form a thick whitewater slurry 72 at consistency levels of approximately 0.2 to 1 percent. The whitewater chemical dispersion 71 is used to obtain reasonable filamentation of wet used strands 18 through steric, thermodynamic, and charge colloidal interactions. A preferred whitewater dispersion 71 includes a cationic dispersant, an anionic viscosity modifier, a defoamer and a biocide. The pH of the whitewater chemical dispersion 71 is maintained at approximately 8 by adding ammonia. To take advantage of charge differences between mostly anionic and partially cationic surfaces of the E-type glass, the cationic dispersant is typically added first, followed by the strands 18, 20, defoamer, and viscosity modifier to form the dispersion 71. Additives such as dry strength agents and wet strength agents known in the art may also be added to the dispersion 71.

The anionic viscosity modifiers used in the whitewater dispersion 71 preferably have molar anionicities between approximately 25 and 40% and molecular weights of about 16 million. One preferred class of anionic viscosity modifiers is a polyacrylamide viscosity modifier such as Nalco 7768, Magnifloc 1886A, and HyChem AE 874. However, other possible viscosity modifiers or flocculants that may be used include hydroxyethyl cellulose and polyamines.

Preferably, the cationic dispersants used comprise ethoxylated alkylamine dispersants such as Nalco 8493, Schercopol DS-140, and Rhodameen VP532. However, other dispersants may be used as well, including amine oxides and polyethoxylated derivatives of amide condensation of fatty acid products. Also, preferred defoamers include Nalco PP04-3840 and Nopco NXZ.

A unique aspect of the present invention is the behavior of the wet chop strands 18 and dry chop strands 20 in the dispersion 71. The wet chop strands 18 have a tendency to spread out randomly within the dispersion 71. The dry chop strands 20 will also randomly orient, however the material tends to stay together in the dispersion 71 (like a log). Hence, the network 14 and subsequently formed permeable mat 10 formed is not a completely random network of wet and dry chop strands 18, 20. As will be discussed below, the permeable mat 10 that is formed has a higher degree of openness as measured by Frazier air permeability. This improves cement impregnation.

The thick slurry 72 formed is maintained under agitation in a single tank 73 or series of tanks. The thick slurry 72 is then delivered through a control valve 74 and combined with a thin stock stream 76 from a silo 78 to form a lower consistency slurry 80 in the former 82. The thin stock stream 76 comprises the same whitewater chemicals as the thick slurry 72 with low concentrations of the strands 18, 20. The ratio of thick slurry 72 to the silo stream 78 in the lower consistency slurry 80 should not exceed 20:1 to obtain good mixing characteristics.

The former 82 functions to equally distribute and randomly align the strands 18, 20 to form the open mesh filament network 14. Formers 82 that can accommodate the initial fiber formation include Fourdrinier machines, Stevens Former, Roto Former, Inver Former, cylinder, and Verti-Former machines. These formers offer several control mechanisms 90 to control fiber orientation within the network 14 such as drop leg and various pond regulator/wall adjustments.

Deposited fibers forming the network 14 are partially dried over a suction box 94 to exhibit correct release characteristics from the former wire 96 to the saturator section 98. Preferably, the network 14 is guided from the former 82 to the saturator section 98 through a contact vacuum roller.

Upon entering the saturator section 98, the network 14 is further dried with a first suction box 100. A binder is then poured onto the network 14 from a curtain coater 16 or similar depositing device. The binder 16 coats and is pulled through the network 14 using a second suction box 104. Additional suction boxes 106 may be employed to control the binder basis weight. Ideally, binder basis weight level is measured at the end of the line 17 using a binder basis-measuring device 108. The network 14 is subsequently dried and cured in a dryer 110 such as a through-air dryer or honeycomb dryer to form the wet formed permeable mat 10.

If optional unidirectional rovings 22 are used, they are introduced to the network 14 from a creel stand 101, wherein operators will string the rovings 22 through guide dyes onto the network 14 that move slightly back and forth in the CD direction. Rovings are saturated with binder and are introduced prior to the binder curtain coater but after the first saturator suction box.

The binder 16 must provide alkalinity resistant for the fibers to work since silica, which is used in the glass network 14, is attacked under strong alkaline conditions. Glass transition temperature is also an important criteria in selecting an appropriate binder 16. For example, binders 16 having a glass transition temperature near the boiling point of water experience moisture diffusion/resin velocity problems that adversely affect film formation and mechanical properties.

Alkaline resistant binders 16 that meet these criteria and may be used include phenolics, melamines, acrylics, styrene-acrylates, styrene butadiene, and ethylene vinyl acetate. Preferably, phenolic-based binders are used, such as Borden Chemical's 5901 phenolic binder. Another preferred non-phenolic based binder that is used is Rohm and Haas' GL618 acrylic copolymer, which has a glass transition temperature of approximately 35 degrees Celsius. Example formulations for the mats 10 without unidirectional rovings 22 made with the 20% by weight acrylic binder and 30% by weight phenolic binder at various mat weights is illustrated below in Tables 1–6, while example formulations for mats 10 made with unidirectional rovings 22 are shown in Tables 7 and 8:

TABLE 1

GL 618 Example Handsheet Formulations
Overall Compositions in a 2 lb/sq mat with 20% Binder

| Name | Description | Company | Amount |
|---|---|---|---|
| 9501 WUCS* | 9501 sized Wet Chop | Owens Corning | 3.3 |
| 893 Chopped SMC | 893 sized Dry Chop | Owens Corning | 3.3 |
| GL 618 | Acrylic Binder | Rohm & Haas | 1.7 |
| Nalclear 7768 | Anionic Viscosity Modifier | Nalco | Trace |
| 8493 | Cationic Dispersant | Nalco | Trace |
| PP04-3840 | Defoamer | Nalco | Trace (Gram) |

*Dry glass portion of WUCS

TABLE 2

Overall Compositions in a 2.5 lb/sq mat with 20% Binder

| Name | Description | Company | Amount |
|---|---|---|---|
| 9501 WUCS* | 9501 sized Wet Chop | Owens Corning | 4.2 |
| 893 Chopped SMC | 893 sized Dry Chop | Owens Corning | 4.2 |
| GL 618 | Acrylic Binder | Rohm & Haas | 2.1 |
| Nalclear 7768 | Anionic Viscosity Modifier | Nalco | Trace |
| 8493 | Cationic Dispersant | Nalco | Trace |
| PP04-3840 | Defoamer | Nalco | Trace (Gram) |

*Dry glass portion of WUCS

TABLE 3

Overall Compositions in a 3.0 lb/sq mat with 20% Binder

| Name | Description | Company | Amount |
|---|---|---|---|
| 9501 WUCS* | 9501 sized Wet Chop | Owens Corning | 5.0 |
| 893 Chopped SMC | 893 sized Dry Chop | Owens Corning | 5.0 |
| GL 618 | Acrylic Binder | Rohm & Haas | 2.5 |
| Nalclear 7768 | Anionic Viscosity Modifier | Nalco | Trace |
| 8493 | Cationic Dispersant | Nalco | Trace |
| PP04-3840 | Defoamer | Nalco | Trace (Gram) |

*Dry glass portion of WUCS

TABLE 4

RE 176 Phenolic Example Handsheet Formulations
Overall Compositions in a 2 lb/sq mat with 30% Binder

| Name | Description | Company | Amount |
|---|---|---|---|
| 9501 WUCS* | 9501 sized Wet Chop | Owens Corning | 2.9 |
| 893 Chopped SMC | 893 sized Dry Chop | Owens Corning | 2.9 |
| AL-5901A | Phenolic Binder | Borden | 2.5 |
| Nalclear 7768 | Anionic Viscosity Modifier | Nalco | Trace |
| 8493 | Cationic Dispersant | Nalco | Trace |
| PP04-3840 | Defoamer | Nalco | Trace (Gram) |

*Dry glass portion of WUCS

TABLE 5

Overall Compositions in a 2.5 lb/sq mat with 30% Binder

| Name | Description | Company | Amount |
|---|---|---|---|
| 9501 WUCS* | 9501 sized Wet Chop | Owens Corning | 3.6 |
| 893 Chopped SMC | 893 sized Dry Chop | Owens Corning | 3.6 |
| AL-5901A | Phenolic Binder | Borden | 3.1 |
| Nalclear 7768 | Anionic Viscosity Modifier | Nalco | Trace |
| 8493 | Cationic Dispersant | Nalco | Trace |
| PP04-3840 | Defoamer | Nalco | Trace (Gram) |

*Dry glass portion of WUCS

TABLE 6

Overall Compositions in a 3.0 lb/sq mat with 30% Binder

| Name | Description | Company | Amount |
|---|---|---|---|
| 9501 WUCS* | 9501 sized Wet Chop | Owens Corning | 4.4 |
| 893 Chopped SMC | 893 sized Dry Chop | Owens Corning | 4.4 |
| AL-5901A | Phenolic Binder | Borden | 3.7 |
| Nalclear 7768 | Anionic Viscosity Modifier | Nalco | Trace |
| 8493 | Cationic Dispersant | Nalco | Trace |
| PP04-3840 | Defoamer | Nalco | Trace (Gram) |

*Dry glass portion of WUCS

TABLE 7

Unidirectional Roving Example Handsheets
Amount of Glass/Whitewater Required for 2.5 lb/sq product at 20% LOI

| Name | Description | Company | Amount |
|---|---|---|---|
| 9501 WUCS* | 9501 sized Wet Chop | Owens Corning | 2.1 |
| 893 Chopped SMC | 893 sized Dry Chop | Owens Corning | 2.1 |
| 377 Roving | 377 Roving | Owens Corning | 4.2 |
| GL 618 | Acrylic Binder | Rohm & Haas | 2.1 |
| Nalclear 7768 | Anionic Viscosity Modifier | Nalco | Trace |
| 8493 | Cationic Dispersant | Nalco | Trace |
| PP04-3840 | Defoamer | Nalco | Trace (Gram) |

*Dry glass portion of WUCS

TABLE 8

Amount of Glass/Whitewater Required for 2.5 lb/sq product at 30% LOI

| Name | Description | Company | Amount |
|---|---|---|---|
| 9501 WUCS* | 9501 sized Wet Chop | Owens Corning | 1.8 |
| 893 Chopped SMC | 893 sized Dry Chop | Owens Corning | 1.8 |
| 377 Roving | 377 Roving | Owens Corning | 3.6 |
| AL-5901A | Phenolic Binder | Borden | 3.1 |
| Nalclear 7768 | Anionic Viscosity Modifier | Nalco | Trace |
| 8493 | Cationic Dispersant | Nalco | Trace |
| PP04-3840 | Defoamer | Nalco | Trace (Gram) |

*Dry glass portion of WUCS

Tables 9A and 9B compares mats 10 made according to the present invention using various binder compositions with known mat systems and mat systems having variations of the preferred mat 10 compositions and to illustrate physical and decorative properties.

TABLE 9A

| Binder Material | Description | Binder Manufacturer | Basis Weight (lb/sq) | Basis Weight (gsm) | LOI (%) | Glass Basis Weight (lb/sq) | Binder Basis Weight (lb/sq) | Thickness (0.001") |
|---|---|---|---|---|---|---|---|---|
| PVC | PVC Scrim - 0/90 PVC/E-Glass Tows (60% LOI) | | 2.2 | 1.1E + 02 | 61 | 0.9 | 1.3 | 11.6 |
| | Roofing Mat | Portland | 1.9 | 9.3E + 01 | 19 | 1.5 | 0.4 | 23.8 |
| 3500 | Enterprise Mat with WUCS/Chopped Roving with EVA Binder | National Starch or Air Products | 1.8 | 8.8E + 01 | 19 | 1.5 | 0.3 | 14.1 |
| 5901E | 5901 Phenolic and 1" 9501 E Glass WUCS | Borden | 2.4 | 1.2E + 02 | 23 | 1.8 | 0.6 | 26.4 |
| 5901A | 5901 Phenolic and 0.75" Advantex 9501 WUCS | Borden | 2.4 | 1.2E + 02 | 21 | 1.9 | 0.5 | 24.7 |
| 618AL | GL618 and 0.75" Advantex 9501 WUCS | Rohm & Haas | 2.1 | 1.0E + 02 | 16 | 1.8 | 0.3 | 23.7 |
| 618EL | GL618 and 1" 9501 E Glass WUCS | Rohm & Haas | 2.2 | 1.1E + 02 | 17 | 1.9 | 0.4 | 24.6 |
| 618EL | GL618 and 50% 1" E 9501/50% Chopped 893 | Rohm & Haas | 2.3 | 1.1E + 02 | 17 | 1.9 | 0.4 | 19.3 |
| 618E | GL618 and 1" E WUCS/Chopped 893/Uni 377 Roving | Rohm & Haas | 2.4 | 1.1E + 02 | 17 | 2.0 | 0.4 | 21.1 |
| 618L | Low GL618 on 9501 1" WUCS | Rohm & Haas | 2.8 | 1.3E + 02 | 32 | 1.9 | 0.9 | 26.1 |
| 618H | High GL618 on 9501 1" WUCS | Rohm & Haas | 3.7 | 1.8E + 02 | 50 | 1.8 | 1.8 | 28.3 |
| 2780L | 2780 Acrylic Low Binder Content on 1" 9501 Wet Chop | Rohm & Haas | 2.4 | 1.1E + 02 | 21 | 1.9 | 0.5 | 20.4 |
| 2780H | 2780 Acrylic High Binder on 50% 1" 9501 and 50% Chopped 893 | Rohm & Haas | 3.4 | 1.6E + 02 | 41 | 2.0 | 1.4 | 21.2 |
| 2780L | 2780 Acrylic Low Binder on 50% 1" 9501 and 50% Chopped 893 | Rohm & Haas | 2.6 | 1.3E + 02 | 23 | 2.0 | 0.6 | 18.1 |
| 720L | 720 Acrylic Low Binder on 1" 9501 WUCS | Rohm & Haas | 2.6 | 1.3E + 02 | 30 | 1.8 | 0.8 | 30.4 |
| 720L | 720 Acrylic Low Binder on 50% 1" 9501/50% Chopped 893 | Rohm & Haas | 2.7 | 1.3E + 02 | 29 | 1.9 | 0.8 | 26.5 |
| 720H | 720 Acrylic High Binder on 50% 1" 9501/50% Chopped 893 | Rohm & Haas | 3.4 | 1.6E + 02 | 41 | 2.0 | 1.4 | 29.1 |
| DX24VL | Dow DX31524 V-Low Binder on 9501 1" WUCS | Dow | 2.2 | 1.0E + 02 | 16 | 1.8 | 0.3 | 22.3 |

TABLE 9A-continued

| Binder Material | Description | Binder Manufacturer | Basis Weight (lb/sq) | Basis Weight (gsm) | LOI (%) | Glass Basis Weight (lb/sq) | Binder Basis Weight (lb/sq) | Thickness (0.001") |
|---|---|---|---|---|---|---|---|---|
| DX24VL | Dow DX31524 V-Low Binder on 50% 1" 9501/50% Chopped 893 | Dow | 2.3 | 1.1E + 02 | 14 | 2.0 | 0.3 | 19.9 |
| DX24M | Dow DX31524 on 50% 1" 9501/50% Chopped 893 | Dow | 2.5 | 1.2E + 02 | 20 | 2.0 | 0.5 | 20.3 |
| D280VL | Dow 280 V-Low Binder on 9501 1" WUCS | Dow | 2.1 | 1.0E + 02 | 13 | 1.8 | 0.3 | 22.9 |
| D280VL | Dow 280 V-Low Binder on 50% 1" 9501/50% Chopped 893 | Dow | 2.3 | 1.1E + 02 | 12 | 2.0 | 0.3 | 19.8 |
| D280M | Dow 280 on 50% 1" 9501/50% Chopped 893 | Dow | 2.4 | 1.2E + 02 | 18 | 2.0 | 0.4 | 23.2 |
| DX49VL | Dow DX31549 V-Low Binder on 9501 1" WUCS | Dow | 2.2 | 1.1E + 02 | 17 | 1.8 | 0.4 | 25.0 |
| DX49VL | Dow DX31549 V-Low Binder on 50% 1" 9501/50% Chopped 893 | Dow | 2.3 | 1.1E + 02 | 15 | 2.0 | 0.3 | 22.8 |
| DX49M | Dow DX31549 Binder on 50% 1" 9501/Chopped 893 | Dow | 2.6 | 1.3E + 02 | 23 | 2.0 | 0.6 | 26.4 |

TABLE 9B

| Binder Material | Description | Binder Manufacturer | Frazier Air Permeability (ft3/min/ft2) | Tensile Strength (pli) | CaO Retention (%) | Hot H$_2$O Retention (%) | MD/CD Comments |
|---|---|---|---|---|---|---|---|
| PVC | PVC Scrim - 0/90 PVC/E-Glass Tows (60% LOI) | | 1600 | 56 | 75 | | 0/90 Roving Orientation |
| | Roofing Mat | Portland | 830 | 38 | 63 | | Oriented Wet Mat |
| 3500 | Enterprise Mat with Wucs/Chopped Roving with EVA Binder | National Starch or Air Products | 990 | 8 | 87–116 | 96 | Oriented Hybrid Mat |
| 5901E | 5901 Phenolic and 1" 9501 E Glass WUCS | Borden | 840 | 21 | 94 | 59 | Random Wet Mat |
| 5901A | 5901 Phenolic and 0.75" Advantex 9501 WUCS | Borden | 700 | 18 | 53 | 48 | Random Wet Mat |
| 618AL | GL618 and 0.75" Advantex 9501 WUCS | Rohm & Haas | 670 | 18 | 111 | 73 | Random Wet Mat |
| 618EL | GL618 and 1" 9501 E Glass WUCS | Rohm & Haas | 760 | 25 | 104 | 97 | Random Wet Mat |

TABLE 9B-continued

| Binder Material | Description | Binder Manufacturer | Frazier Air Permeability (ft3/min/ft2) | Tensile Strength (pli) | CaO Retention (%) | Hot H₂O Retention (%) | MD/CD Comments |
|---|---|---|---|---|---|---|---|
| 618EL | GL618 and 50% 1" E 9501/50% Chopped 893 | Rohm & Haas | 1000 | 23 | 104 | | Random Hybrid Mat |
| 618E | GL618 and 1" E WUCS/ Chopped 893/ Uni 377 Roving | Rohm & Haas | 970 | 41 | 98 | | MD Uni + Random Hybrid |
| 618L | Low GL618 on 9501 1" WUCS | Rohm & Haas | 730 | 41 | 91 | | Random Wet Mat |
| 618H | High GL618 on 9501 1" WUCS | Rohm & Haas | 630 | 49 | 101 | | Random Wet Mat |
| 2780L | 2780 Acrylic Low Binder Content on 1" 9501 Wet Chop | Rohm & Haas | 810 | 10 | 125 | | Random Wet Mat |
| 2780H | 2780 Acrylic High Binder on 50% 1" 9501 and 50% Chopped 893 | Rohm & Haas | 830 | 17 | 89 | | Random Hybrid Mat |
| 2780L | 2780 Acrylic Low Binder on 50% 1" 9501 and 50% Chopped 893 | Rohm & Haas | 930 | 10 | 101 | | Random Hybrid Mat |
| 720L | 720 Acrylic Low Binder on 1" 9501 WUCS | Rohm & Haas | 780 | 12 | 86 | | Random Wet Mat |
| 720L | 720 Acrylic Low Binder on 50% 1" 9501/50% Chopped 893 | Rohm & Haas | 840 | 13 | 63 | | Random Hybrid Mat |
| 720H | 720 Acrylic High Binder on 50% 1" 9501/50% Chopped 893 | Rohm & Haas | 790 | 19 | 99 | | Random Hybrid Mat |
| DX24VL | Dow DX31524 V-Low Binder on 9501 1" WUCS | Dow | 750 | 23 | 94 | | Random Wet Mat |
| DX24VL | Dow DX31524 V-Low Binder on 50% 1" 9501/50% Chopped 893 | Dow | 910 | 18 | 88 | | Random Hybrid Mat |
| DX24M | Dow DX31524 on 50% 1" 9501/50% Chopped 893 | Dow | 840 | 24 | 91 | | Random Hybrid Mat |
| D280VL | Dow 280 V-Low Binder on 9501 1" WUCS | Dow | 850 | 18 | 93 | | Random Wet Mat |
| D280VL | Dow 280 V-Low Binder on 50% 1" 9501/50% Chopped 893 | Dow | 1000 | 12 | 88 | | Random Hybrid Mat |
| D280M | Dow 280 on 50% 1" 9501/50% Chopped 893 | Dow | 1000 | 16 | 88 | | Random Hybrid Mat |
| DX49VL | Dow DX31549 V-Low Binder on 9501 1" WUCS | Dow | 810 | 17 | 56 | | Random Wet Mat |
| DX49VL | Dow DX31549 V-Low Binder | Dow | 960 | 10 | 73 | | Random Hybrid |

TABLE 9B-continued

| Binder Material | Description | Binder Manufacturer | Frazier Air Permeability (ft3/min/ft2) | Tensile Strength (pli) | CaO Retention (%) | Hot H$_2$O Retention (%) | MD/CD Comments |
|---|---|---|---|---|---|---|---|
| | on 50% 1" 9501/50% Chopped 893 | | | | | | Mat |
| DX49M | Dow DX31549 Binder on 50% 1" 9501/Chopped 893 | Dow | 940 | 20 | 85 | | Random Hybrid Mat |

Tables 9A and 9B illustrate that the combination of strands 18, 20, generally maintain or improve the Frazier Air Permeability of the various systems without significantly adversely affecting mechanical properties such as CaO percent retention and hot water retention. Tables also indicate that tensile strength may be affected as the ratio of wet use chop strands 18 to dry use strands 20 decreases. This is believed to be a result of the dry use strands 20 forming additional logs in the network 14, which increase Frazier Air Permeability but decrease tensile strength of the network 14.

The mat 10 formed in FIG. 3 above may then be applied to form a cement backerboard 110 in a conventional method such as the method described in U.S. Pat. No. 3,284,980 to Dinkel, which is herein incorporated by reference and described below in FIGS. 4–9.

Figure 4:
FIGS. 4–9 illustrate the manner of precasting the cement backerboard using the wet permeable mat of FIG. 3.
Figure 5:
Figure 6:
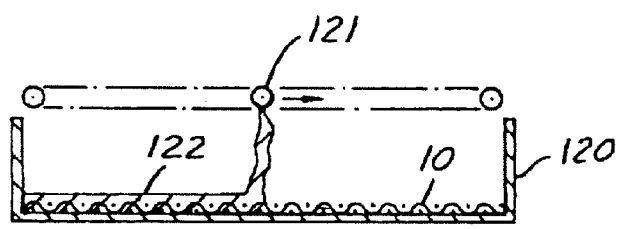

Referring now to FIG. 4–6, into a form 120 of a size of the desired cement backerboard 110 panel, a layer of wet formed permeable mat 10 is laid. A slurry 122 containing hydraulic cement of a suitable consistency to permit penetration thereof through the openings in the open permeable mat 10 is applied, as from the traveling supply pipe 121. The amount of cement slurry 122 introduced is sufficient to cover the mat 10 completely so that substantially all the network 14 is immersed or embedded; the slurry penetrates the openings in the fibers 18, 20 and optional rovings 22 and fills them so that the mat 10 is enveloped on both sides. Normally this is only a light envelopment, although an excess is sometimes needed where the aggregate in the core is large and the boundary surface presented by the core is very rough.

Figure 7:
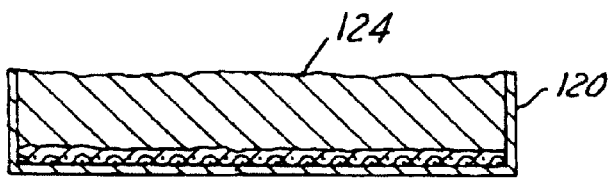

In the next step, as shown in FIG. 7, the core mixture 124 of aggregate and hydraulic cement is poured into the form 120; the water content is normally kept on the low side within the range for best strength development in the concrete. A typical mix of the core mixture 124 is three volumes of light weight aggregate, one volume Portland cement and three-fourths volume of water. The core mixture 124 is then rodded off flush with the top of the form 120, as shown in FIG. 7, at the top boundary of the core mixture 124 some depressions will usually be present due to the openings between aggregate particles, to voids from the air entrainment or other cause, resulting from the coarse nature of the core mixture 124 composition.

Figure 8:
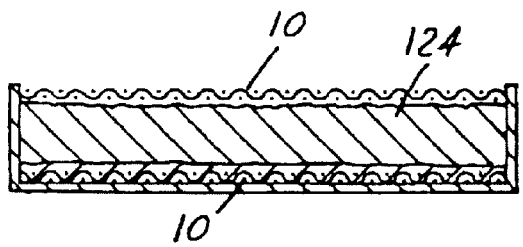

Referring to FIG. 8, a layer of wet formed permeable mat 10 is laid over the top of the core mixture 124. The thickness of the mat 10 ordinarily is so slight that it does not add materially to the thickness of the core 124.

Figure 9:
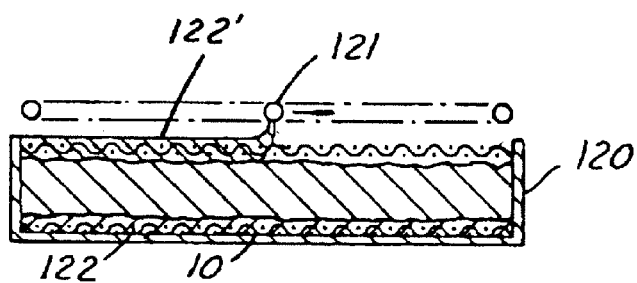

As shown in FIG. 9, the last layer of hydraulic cement slurry 122' is poured over the mat 10 from traveling supply pipe 121, or applied by other suitable means. The slurry 122' penetrates the openings in the mat 10 and also into the voids, openings or surface irregularities at the upper boundary surface of core 124. Sufficient slurry 122' is deposited to penetrate and fill the openings and voids in the core 124 surface, to fill the openings in the fibers 18, 20 and to lightly cover the mat 10, or at least be flush with its outer surface; it is then rodded or otherwise leveled. The mat 10 is normally kept as close to the ultimate surface of the finished panel as possible inasmuch as the maximum benefit and greatest strength is thereby realized from the fiber strands 18, 20.

After the composite panel 110 is prepared it is left in the form 120 for sufficient time to effect initial cure, or complete cure if desired; the use of a plastic film covering to retain moisture or the use of steam curing is advantageous.

The cement backerboards 110 formed according to the present invention offer many advantages over known PVC glass scrims. These backerboards 110 offer economical advantages in that the mat 10 be formed in a single operation and requires less binder 16 material than known scrim systems. Further, the backerboards 110 formed offer superior decorative finishes by preventing sink marks and pitting.

In addition, the present invention offers improved cement impregnation because the permeable mat 10 formed is not a completely random network of wet and dry chop strands 18, 20, and optional rovings 22, thereby giving a mat 10 with a higher degree of openness as measured by Frazier air permeability as compared with some known systems. Further, permeability to cement impregnation may be adjusted by simply altering the ratio of wet chop strands 18 to dry chop strands 20 in the mat 10, which in turn affects the ultimate physical properties such as tensile strength within the cement backerboards 110.

While the invention has been described in terms of preferred embodiments, it will be understood, of course, that the invention is not limited thereto since modifications may be made by those skilled in the art, particularly in light of the foregoing teachings.

What is claimed is:

1. A method for forming a random open mesh filament network for use in reinforced cement backerboards comprising:

forming a thick slurry of a whitewater chemical dispersion having a plurality of wet use chop strands and a plurality of dry chop fiber strands, wherein the ratio by weight of said plurality of wet use chop strands and said plurality of dry use chop strands within said mixture is between approximately 3:1 and 1:3;

introducing said thick slurry to a thin stock stream slurry to form a lower consistency slurry, introducing said lower consistency slurry to a former, aligning said plurality of wet use chop strands and said plurality of dry chop fiber strands within said former to form the random open mesh filament network, wherein a substantial amount of said dry chop fiber strands form randomly oriented logs; and partially drying the random open mesh filament network.

2. The method of claim 1, wherein forming a thick slurry comprises forming a thick slurry comprising a cationic dispersant, an anionic viscosity modifier, a defoamer, a biocide, a plurality of wet use chop strands and a plurality of dry chop fiber strands.

3. The method of claim 2, wherein forming a thick slurry of a whitewater chemical dispersion comprises:

(a) introducing a cationic dispersant to a tank under agitation;

(b) introducing a mixture of a plurality of wet use chop strands and a plurality of dry chop fiber strands to (a), wherein the ratio by weight of said plurality of wet use chop strands and said plurality of dry use chop strands within said mixture is between approximately 3:1 and 1:3;

(c) introducing a defoamer to (b);

(d) introducing an anionic viscosity modifier to (c).

4. The method of claim 2, wherein said anionic viscosity modifier is selected from the group consisting of a polyacrylamide viscosity modifier, a hydroxyethyl cellulose viscosity modifier, and a polyamine viscosity modifier.

5. The method of claim 2, wherein said cationic dispersant is selected from the group consisting of an ethoxylated alkylamine dispersant, an amine oxide dispersant, and a polyethyoxylated derivative of an amide condensated fatty acid dispersant.

6. The method of claim 1, wherein said plurality of wet use chop strands and said plurality of dry chop fiber strands each have lengths between approximately 0.75 and 1.5 inches.

7. The method of claim 2, wherein forming a thick slurry comprises forming a thick slurry of a whitewater chemical dispersion having a plurality of wet use chop strands, a plurality of dry chop fiber strands and a plurality of unidirectional rovings.

8. The method of claim 6, wherein forming a thick slurry comprises forming a thick slurry of a whitewater chemical dispersion, wherein forming a thick slurry comprises:

(a) introducing a cationic dispersant to a tank under agitation;

(b) introducing a mixture of a plurality of wet use chop strands and a plurality of dry chop fiber strands to (a), wherein the ratio by weight of said plurality of wet use chop strands and said plurality of dry use chop strands within said mixture is between approximately 3:1 and 1:3;

(c) introducing a plurality of unidirectional rovings to (a), wherein said plurality of unidirectional rovings comprise between approximately 20 and 50 percent of the total weight of said mixture and said plurality of unidirectional rovings;

(d) introducing a defoamer to (c);

(e) introducing an anionic viscosity modifier to (d).

9. The method of claim 8, wherein said anionic viscosity modifier is selected from the group consisting of a polyacrylamide viscosity modifier, a hydroxyethyl cellulose viscosity modifier, and a polyamine viscosity modifier, wherein said cationic dispersant is selected from the group consisting of an ethoxylated alkylamine dispersant, an amine oxide dispersant, and a polyethyoxylated derivative of an amide condensated fatty acid dispersant.

10. A randomly oriented open mesh glass filament network for use in a cement backerboard comprising:

a mixture of a plurality of wet use chop strands and a plurality of dry chop fiber strands, wherein said plurality of wet use chop strands and said plurality of dry chop fiber strands each have lengths between approximately 0.75 and 1.5 inches, wherein the ratio by weight of said plurality of wet use chop strands and said plurality of dry use chop strands within said mixture is between approximately 3:1 and 1:3, and wherein a substantial amount of said dry chop fiber strands form randomly oriented logs; and a whitewater chemical dispersion.

11. The network of claim 10, wherein the ratio by weight of said plurality of wet use chop strands and said plurality of dry use chop strands within said mixture is between approximately 3:1 and 1:3.

12. The network of claim 10, wherein said plurality of wet use chop strands is selected from the group consisting of a plurality of wet use chop E-type glass strands, a plurality of wet use chop S-type glass strands, a plurality of wet use chop ECR-type glass strands, a plurality of wet use chop alkaline resistant glass strands, and combinations thereof.

13. The network of claim 11, wherein said plurality of dry chop fiber strands is selected from the group consisting of a plurality of dry chop E-type glass strands, a plurality of dry chop S-type glass strands, a plurality of dry chop ECR-type glass strands, a plurality of dry chop alkaline resistant glass strands, and combinations thereof.

14. The network of claim 11, wherein said randomly oriented open mesh glass filament network further comprises a plurality of unidirectional rovings, said plurality of unidirectional rovings comprising approximately 20 to 50 percent by weight of said randomly oriented open mesh filament network.

15. The network of claim 10, wherein said whitewater chemical dispersion comprises a cationic dispersant, an anionic viscosity modifier, a defoamer, and a biocide.

* * * * *